United States Patent [19]

Fukuda et al.

[11] Patent Number: 5,392,640
[45] Date of Patent: Feb. 28, 1995

[54] VEHICLE PERFORMANCE INSPECTION APPARATUS AND VEHICLE PERFORMANCE INSPECTION METHOD

[75] Inventors: Yutaka Fukuda, Saitama; Kouji Minagawa, Chiba, both of Japan

[73] Assignee: Anzen Motor Co., Ltd., Tokyo, Japan

[21] Appl. No.: 991,294

[22] Filed: Dec. 16, 1992

[30] Foreign Application Priority Data

May 1, 1992 [JP] Japan .................................. 4-139764

[51] Int. Cl.$^6$ .......................................... G01M 15/00
[52] U.S. Cl. ................... 73/117; 73/118.1; 73/125
[58] Field of Search ............... 73/117, 118.1, 123–125, 73/162

[56] References Cited

U.S. PATENT DOCUMENTS

| | | | |
|---|---|---|---|
| 3,690,165 | 9/1972 | Sturmo et al. | 73/117 |
| 3,803,909 | 4/1974 | Ostrander | 73/117 |
| 3,962,914 | 6/1976 | Lutz | 73/125 |
| 4,158,961 | 6/1979 | Ben-David . | |
| 4,932,252 | 6/1990 | Bovenlander et al. | 73/125 |

FOREIGN PATENT DOCUMENTS

| | | |
|---|---|---|
| 4-1479 | 1/1988 | Japan . |
| 2-21234 | 1/1990 | Japan . |
| 3-211439 | 9/1991 | Japan . |
| 4-58133 | 2/1992 | Japan . |
| 4-58134 | 2/1992 | Japan . |
| 4-75940 | 7/1992 | Japan . |
| 4-85248 | 7/1992 | Japan . |
| 4-198835 | 7/1992 | Japan . |
| 4-198836 | 7/1992 | Japan . |
| 4-204346 | 7/1992 | Japan . |
| 4-204347 | 7/1992 | Japan . |
| 4-204348 | 7/1992 | Japan . |
| 4-215032 | 8/1992 | Japan . |
| 4-221737 | 8/1992 | Japan . |
| 4-221738 | 8/1992 | Japan . |
| 4-221739 | 8/1992 | Japan . |
| 4-305133 | 10/1992 | Japan . |
| 4-305134 | 10/1992 | Japan . |
| 5-72079 | 3/1993 | Japan . |
| 5126684 | 5/1993 | Japan . |
| 5187967 | 7/1993 | Japan . |
| 567905 | 9/1993 | Japan . |
| 5238376 | 9/1993 | Japan . |
| 5240742 | 9/1993 | Japan . |
| 658845 | 3/1994 | Japan . |

*Primary Examiner*—Robert Raevis
*Attorney, Agent, or Firm*—Evenson, McKeown, Edwards & Lenahan

[57] ABSTRACT

The present invention intends to allow evaluation of the performances of of the function of the ABS, the function of the LSD, and the function of the TRC to be effected easily by using a performance inspection apparatus with prescribed constitution wherein, in addition to a pair of receptive support rollers for receiving a wheel of a vehicle and for supporting the weight of the vehicle directly, a rotation detecting roller which is rotatably driven by said wheel and/or inertially rotatably driven and is separated from the weight of the vehicle is provided, and data required for evaluation of the operational state and the performance of the ABC function, the LSD function, and the TRC function can be detected respectively by mutually changing and sectioning the arrangements including the rotation detecting rollers.

3 Claims, 7 Drawing Sheets

VEHICLE PERFORMANCE INSPECTION APPARATUS AND VEHICLE PERFORMANCE INSPECTION METHOD

BACKGROUND OF THE INVENTION

1. Field of the Invention

The invention relates to a vehicle performance inspection apparatus and a vehicle performance inspection method, and more particularly to a vehicle performance inspection apparatus and a vehicle performance inspection method wherein the operational state and the performance of the function of the ABS (anti-lock brake system) in a vehicle are evaluated and when the operational state and the performance of the LSD (limited slip differential) function and the TRC (traction control) function are evaluated, the arrangements are correspondingly changed and sectioned for evaluation and when the operational state and the performance of the ABS function, the LSD function, and the TRC function are evaluated, the arrangements are correspondingly and mutually changed and sectioned for evaluation.

2. Prior Art

Conventionally, the ABS control in a vehicle is well known as a function for securing favorably and effectively the running stability and the steerability at the time of abrupt braking operation by controlling the braking force correspondingly to the degree of the lock of each of the front and rear wheels at the time of the abrupt braking operation to prevent the running direction of the vehicle from inadvertently deviating due to the locked state of the wheels.

The LSD control in a vehicle is well known as a function for securing favorably and effectively the running stability and the steerability at the time of deviated operation by distributing, in a so-called differential mechanism for absorbing the difference between rotations of the left and right wheels at the time of deviated operation of the running direction of the vehicle, the rotational driving torque optimally to each of the left and right wheels correspondingly to the difference between rotations of the left and right wheels.

Further, the TRC control in a vehicle is well known as a function for securing favorably and effectively the running stability and the runnability at the time of starting and quick acceleration. By controlling optimally the rotational driving force to be transmitted to the left and right driving wheels from the mounted engine correspondingly to the conditions of the running surfaces the TRC restrains the spinning of the left and right driving wheels which is liable to occur at the time of the starting or quick acceleration.

That is, out of the above functions, for example, the ABS function works by constitution composed of a computer as a main control device, wheel speed detecting means of detecting the wheel speeds of front left and right and rear left and right wheels and outputting wheel speed signals, and oil pressure supply control means of controlling the oil pressure forces to respective braking cylinders for the left and right wheels based on the selected control signals from the computer.

From the computer, based on the wheel speed signals outputted from the wheel speed detecting means, selected control signals for obtaining adequate braking forces corresponding to the speed of the vehicle and the conditions of the running surfaces are outputted to the oil pressure supply control means to adjust the mode of the oil pressure supply control means so that when the wheel speed RS has been decreased greatly in comparison to the vehicle speed CS (when the particular wheel has come near to the locked state), the oil pressure supplied to the braking cylinder for the particular wheel may be decreased to reduce the braking force whereas when the wheel speed RS has come near to the vehicle speed CS, the oil pressure supplied to the braking cylinder for the particular wheel may be increased to enhance the braking force and these operations may be repeated to allow desired optimum braking operation even at the time of abrupt braking operation.

Therefore, it is considered that vehicles fitted with the above ABS function will become popular in the future quickly and accordingly development of a performance inspection apparatus for evaluating quickly and easily whether an ABS function built in a vehicle operates normally and smoothly at all times, that is, development of an ABS performance inspection apparatus is desired strongly. The desire of development is also present for a performance inspection apparatus for vehicles fitted with the above LSD function and TRC function, which are not described herein because their constitution is well known.

A conventional typical simulating ABS performance inspection apparatus is suggested, for example, in Japanese Patent Application No. Sho 62-304577 and the constitution thereof is shown schematically in FIG. 10

That is, the constitution of the suggested ABS performance inspection apparatus shown in FIG. 10 is such that pairs of parallel receptive support rollers 1 and 2 which are arranged rotatably and positioned to correspond to the front left and right wheels and rear left and right wheels of a vehicle, the front left and right wheels and rear left and right wheels 3 of the vehicle whose performance is to be inspected are received and supported orthogonally on the receptive support rollers 1 and 2, a motor 4 is connected to one side of one of the paired receptive support rollers 1 and 2, for example, one side of the receptive support roller 1 so that that receptive support roller 1 may act as a driving receptive support roller and the other receptive support roll 2 may act as a driven receptive support roller, torque detection means (for example, a torque meter) is situated between one side of said particular driving receptive roller and the motor 4, and rotational frequency detection means (for example, a pulse meter) 5 is situated on the other side.

Thus, in the suggested ABS performance inspection apparatus having the above constitution, the front or rear left and right wheels of a vehicle whose performance is to be inspected are received and supported orthogonally on the pairs of the receptive support rollers 1 and 2, then the driving receptive support rollers 1 are rotatably driven by the motors 4 so that the received and supported particular wheels 3 may be rotated, for example, at a speed of about 30 to 60 km/h under the control of the rotational frequency detection means 5, and after the rotational speed is bought to the steady state, with the driven rotational state of the driving receptive support rollers 1 being kept, the braking action on the left and right wheels 3, that is, the braking operation is started from inside the vehicle.

With the start of the above braking action the driving torques or the load changes produced between the driving receptive support rollers 1 and the wheels 3 and also between the receptive support rollers 1 and 2 and the wheels 3 are detected by the torque detection means 6, and in this case since the torque values detected by the torque detection means 6 correspond approximately to the load resistances between the wheels and a running surface, an inspection by simulating the desired ABS control becomes possible for a vehicle whose performance is to be inspected.

In this case, since, in particular, the measurement is possible with the driving receptive support rollers 1 being rotationally driven, in other words, with the subject vehicle receiving load resistances all the time from the receptive support rollers 1 and 2 which simulate actual running surfaces, the inspection of the braking performance can be effected in a state approximating the actual road surface situations.

On the other hand, since the driving receptive support rollers 1 are driven to rotate and after the wheels 3 of the vehicle received and supported on the receptive support rollers 1 and 2 are brought to a steady rotational speed, a prescribed braking action is started, the load resistance between the particular driving receptive support rollers 1 and the wheels 3 do not change and therefore the state of the braking action by the ABS function can be easily grasped for actual road surface situations.

If the above suggested ABS performance inspection apparatus is studied in detail, in the case where, in this performance inspection apparatus, the weight of the vehicle whose performance is to be inspected including the load on the vehicle is proportioned to the weight of the pairs of the receptive support rollers substantially supporting that weight, in other words, they are in accord with each other, the inspection of the ABS control for actual road surface situations by simulation is possible as is shown by a curve (a) in FIG. 3 described later, and no particular fear of a problem arises if the ABS performance inspection apparatus is applied to special types of vehicles whose weight is nearly constant at all times such as passenger cars.

However, if the weight of the subject vehicle and the weight of the driving receptive support rollers are not proportioned to each other and only the weight of the vehicle is increased relatively, the weights of them are not in accord with each other and, as is shown by a curve (c) in FIG. 3, when a braking action is taken from inside the vehicle, then the rotational driving forces of the driving receptive support rollers by the motors are excessively suppressed and the vehicle speed drops sharply, thereby leading to a state wherein the ABS control cannot be carried out, whereas if the weight of the vehicle is decreased relatively, as is shown in by a curve (b) in FIG. 3, when a braking action is taken from inside the vehicle, the rotational driving forces by the motors are not correspondingly suppressed sufficiently, and the ABS control is not necessarily worked favorably.

Accordingly, in the case of the suggested ABS performance inspection apparatus, although it is effective when it is applied to the performance inspection of the ABS function of the same kind of vehicles whose weights are approximately the same, there is a problem that it cannot always be applied in general to vehicles whose weights are varied.

Although performance inspection apparatuses for the above LSD function and TRC function are not described herein, proper performance inspection apparatuses that work for these functions respectively are not found now and development of performance inspection apparatuses for the LSD function and the TRC function is still demanded strongly.

OBJECTS OF THE INVENTION

Taking the above conventional problems into account, the present invention has been made and the first object of the present invention is to provide a vehicle performance inspection apparatus and a vehicle performance inspection method that are free from the above problems and by which the performance of the desired ABS function can be easily and effectively evaluated. The second object of the present invention is to provide a vehicle performance inspection apparatus and a vehicle performance inspection method that make it possible to evaluate the performance of the LSD function and the performances of the TRC function respectively and also make it possible to evaluate the performance of the ABS function, the LSD function, and the TRC function respectively by a single apparatus if necessary.

Other objects of the present invention will become apparent readily from the following description.

SUMMARY OF THE INVENTION

In order to achieve the above objects, the vehicle performance inspection apparatus and the vehicle performance inspection method according to the present invention comprise a performance inspection apparatus with a prescribed structural constitution for the ABS function wherein, in order to perform the ABS control independent of the weight of the vehicle whose performance is to be inspected, in addition to a pair of receptive support rollers for receiving and supporting the wheel of said vehicle, i.e., a pair of receptive support rollers for directly receiving and supporting the weight of the vehicle, a rotation detecting roller that can be forcibly brought into contact with the received and supported wheel, can be rotatably driven by said wheel, and can be inertially rotatably driven is provided apart from the support of the weight of the wheel and data necessary for the evaluation of the operational state and the performance of the ABS function are detected by an arrangement including said rotation detecting roller.

Further, in order to utilize suitably and effectively a prescribed arrangement as a performance inspection apparatus for the ABS function, left and right pairs of receptive support rollers (one of the paired receptive support rollers being a driving roller and the other being a driven roller) for receiving and supporting the left and right wheels of a vehicle whose performance is to be inspected are provided, rotation detecting rollers which can be forcibly brought in contact with the left and right received and supported wheels and can be rotatably driven by said left and right wheels are provided on the right and the left respectively, and by changing and sectioning the arrangements including said rotation detecting rollers, data necessary for the evaluation of the operational state and the performance of the LSD function and the TRC function can be respectively detected.

Moreover, in order to utilize suitably and effectively a prescribed arrangement as a performance inspection apparatus for the ABS function, left and right pairs of driving receptive support rollers (one of the paired receptive support rollers being a driving roller and the other being a driven roller) for receiving and supporting the left and right wheels of a vehicle whose performance is to be inspected are provided, rotation detecting rollers which can be forcibly brought in contact with the left and right received and supported wheels, can be rotatably driven by said left and right wheels, and, if necessary, can be selectively and inertially rotatably driven are provided on the right and the left respectively, and by changing and sectioning mutually the arrangements including said rotation detecting rollers, data necessary for the evaluation of the operational state and the performance of the ABS function, the LSD function, and the TRC function can be respectively detected.

The vehicle performance inspection apparatus according to the first invention of the present invention is characterized in that it comprises at least: left and right pairs of parallel receptive support rollers, one the paired receptive support rollers being a driving receptive support roller and the other being a driven receptive support roller, for receiving and supporting the left and right wheels of the front wheel section and the rear wheel section of a vehicle, left and right motors for rotatably driving the left and right driving receptive support rollers, left and right rotation detecting rollers that can be forcibly brought in contact with the left and right wheels received and supported on said left and right driving receptive support rollers and said left and right driven receptive support rollers and can be rotated subordinatively, left and right rotation frequency detecting means for detecting the rotational frequencies of said left and right wheels through said left and right rotation detecting rollers, left and right inertial rotating means that are inertially rotated by the subordinative rotation through said left and right rotation detecting rollers, and torque detecting means of detecting driving torques respectively between said rotation detecting rollers for the respective left and right wheels and said inertial rotating means for the respective rotation detecting rollers, thereby allowing the operational state of the ABS control to be evaluated.

The vehicle performance inspection apparatus according to the second invention of the present invention is characterized in that it comprises left and right pairs of parallel receptive support rollers, one of the paired receptive support rollers being a driving receptive support roller and the other being a driven receptive support roller, for receiving and supporting the left and right wheels of the driving section of a vehicle, main clutch means of connecting or disconnecting the left and right driving receptive support rollers, main rotational frequency detecting means of detecting the rotational frequencies of the driving receptive support rollers, left and right motors that car be connected to or disconnected from the left and right driving receptive support rollers through left and right clutch means and can also act as voltage generating means as loads, left and right torque detecting means of detecting the driving torques between the left and right voltage generating means as loads and the driving receptive support rollers, left and right rotation detecting rollers that can subordinatively be rotated by causing them to be forcibly brought into contact with the left and right wheels received and supported on the left and right driving receptive support rollers and driven receptive support rollers, and left and right rotational frequency detecting means of detecting the rotational frequencies of the wheels through said rotation detecting means, thereby allowing the operational states of the LSD control and the TRC control to be evaluated individually.

The vehicle performance inspection apparatus according to the third invention of the present invention is characterized in that it comprises at least: left and right pairs of parallel receptive support rollers, one of the paired receptive support rollers being a driving receptive support roller and the other being a driven receptive support roller, for receiving and supporting the left and right wheels the driving section of a vehicle, main clutch means of connecting or disconnecting the left and right driving receptive support rollers, main rotational frequency detecting means of detecting the rotational frequencies of the driving receptive support rollers, left and right motors that can be connected to or disconnected from the left and right driving receptive support rollers through clutch means and can also act as voltage generating means as loads, left and right first torque detecting means of detecting the driving torques between the left and right voltage generating means as loads and the driving receptive support rollers associated therewith, left and right rotation detecting rollers that can subordinatively be rotated by causing them to be forcibly brought into contact with the left and right wheels received and supported on the left and right driving receptive support rollers and driven receptive support rollers, left and right rotational frequency detecting means of detecting the rotational frequencies of the left and right wheels through said left and right rotation detecting means, left and right inertial rotating means that can be connected to or disconnected from said left and right rotation detecting rollers through left and right change-over clutch means and can be rotated inertially by the above subordinative rotation, and left and right second torque detecting means of detecting the driving torques between the rotation detecting rollers for said left and right wheels and the inertial rotating means associated with said rotation detecting rollers, thereby allowing the operational states and the performances of the ABS control, the LSD control and the TRC control to be evaluated individually.

The vehicle performance inspection method according to the fourth invention of the present invention comprises the steps of receiving and supporting wheels of a vehicle on parallel receptive support rollers arranged in pairs, rotatably driving at least one of the paired receptive support rollers from outside to rotate the wheels, and forcibly bringing rotation detecting rollers into contact with the received and supported wheels to rotate the rotation detecting rollers subordinately thereby also causing inertial rotation. Then after bringing the rotational speed of the wheels to a steady state by said receptive support rolls, a braking action is applied on the wheels while keeping said rotational speed, and the operational state of the ABS control is evaluated on the basis of changes in the driving torques produced between the rotation detecting rollers and the inertia rotating means and changes in the rotational frequencies of the wheels which are caused correspondingly to the state of the braking action.

The vehicle performance inspection method according to the fifth invention of the present invention comprises the steps of receiving and supporting left and right driving wheels of a vehicle on left and right pairs of parallel receptive support rollers respectively, one of the paired receptive support rollers being a driving roller and the other being a driven roller, and forcibly bringing left and right rotation detecting rollers into contact with the received and supported left and right wheels respectively. A load is applied to one of the left and right driving receptive support rollers while while not applying a load to the other so that an operational state similar to a deviated operation at the time of the start of the vehicle may be set. Then the received and supported left and right driving wheels are rotatably driven from inside the vehicle, thereby allowing the left and right detection rollers to be rotated subordinately. Under the thus set operational state, the driving torque obtained from the driving receptive support roller having the load and the rotation frequency of the corresponding rotation detecting means are compared with the driving torque obtained from the nonloaded driving receptive support roller and the rotational frequency of the corresponding rotation detecting roller, and the operational state of the LSD control is evaluated on the basis of changes of the driving torques and changes of the rotational frequencies.

The vehicle performance inspection method according to the sixth invention of the present invention comprises the steps of receiving and supporting left and right driving wheels of a vehicle on left and right pairs of parallel receptive support rollers respectively, one of the paired receptive support rollers being a driving roller and the other being a driven roller, connecting the electricity generating loads to the left and right driving receptive support rollers to apply loads to the left and right driving receptive support rollers respectively, and bringing forcibly the left and right rotation detecting rollers into contact with the received and supported left and right wheels respectively. Then said left and right wheels are rotated from inside the vehicle so that an operational state similar to that wherein the vehicle is started abruptly or is accelerated abruptly may be set, under the thus set operational state, the rotational frequencies obtained from the loaded left and right driving receptive support rollers are compared with the rotational frequencies obtained from the left and right rotation detecting rollers, and the operational state of the TRC control is evaluated on the basis of changes in these rotational frequencies.

Therefore, in the first (fourth) invention of the present invention, each of the wheels of a vehicle is received and supported on each of the pairs of the parallel receptive support rollers and is rotated by the receptive support roller, each of the rotation detecting rollers is forcibly brought into contact with each of the wheels so that the rotation detecting roller may be driven and rotated inertially, then at the point where the wheels have attained a steady rotational speed, a braking action on the wheels is taken with the particular rotational speed being kept, under the braked state, the driving torques produced between the rotation detecting rollers and the inertial rotating means are allowed to be detected by the torque detecting means, and the rotational frequencies are allowed to be detected by the rotational frequency detecting means, so that on the basis of the changes of the driving torques and the changes of the rotational frequencies the operational state of the ABS control can be evaluated.

In the second (fifth and sixth) invention(s) of the present invention, each of the left and right driving wheels of a vehicle is received and supported on each of the pairs of the left and right parallel receptive support rollers, one of the paired receptive support rollers being a driving roller and the other being a driven roller, and the left and right rotating rollers are forcibly brought into contact with the received and supported wheels. Then the main clutch means are made inactive and at the same time said electricity generating load which is a motor is applied through the clutch means to one of the left and right driving receptive support rollers while the other driving receptive roller is kept in an nonloaded state with the clutch means left inactive, so that an operational state similar to a deviated operation at the time of start of the vehicle is set. Then, the left and right wheels are rotated from inside the vehicle thereby also causing the left and right rotation detecting rollers forcibly brought into contact with the wheels to be driven and inertially rotated. Under the thus set operational state, on the loaded side, the driving torque produced between the load and the driving receptive support roller can be detected by the torque detecting means of the particular driving receptive support roller, and the rotational frequency of the loaded driving wheel can be detected by the rotational frequency detecting means of the particular rotation frequency detecting roller, while, on the nonloaded side, the driving torque of .the driving receptive support roller with no load can be detected by the torque detecting means of the particular driving receptive support roller, and the rotational frequency of the wheel with no load can be detected by the rotational frequency detecting means of the particular rotation frequency detecting roller, so that the operational state of the LSD control can be evaluated on the basis of changes in the driving torques and changes of the rotational frequencies. If the states of the loads to be applied to the left and right driving receptive support rollers through the clutch mechanism are made different from each other, the LSD test of the case where one of the wheels of a vehicle passes through a place whose frictional coefficient is different from that of the other places on which other wheels run becomes possible.

On the other hand, the left and right driving wheels of a vehicle are received and supported respectively on the left pair of the driving receptive support roller and the driven receptive support roller arranged in parallel and the right pair of the driving receptive support roller and the driven receptive support roller arranged in parallel, the left and right driving receptive support rollers are connected through the main clutch means, and the motors that can generate electricity and serve as loads are connected through the clutch means to the left and right driving receptive support rollers respectively. Then, the left and right wheels are rotated from inside the vehicle so that an operational state simulating the starting, abrupt starting, or abrupt acceleration may be set, under the this operational state, thus the rotational frequency of the driving wheels loaded with the left and right driving receptive support rollers having the loads can be detected by the main rotational frequency detecting means, while the rotational frequencies of the driving wheels with no load can be detected by the respective rotational frequency detecting means through the rotation detecting rollers on the nonloaded side, so that the operational state of the TRC control can be evaluated on the basis of changes of these rotational frequencies. Further in the case of 4WD type, by allowing a difference to be present between the values of the load on the front wheel and the load on the rear wheel in the same way as above, the test of the LSD between the front wheels and the rear wheels can be effected.

In the third (fourth, fifth, and sixth) invention(s) of the present invention, the left and right driving wheels of a vehicle are received and supported on the left pair of the driving receptive support roller and the driven receptive support roller arranged in parallel and the right pair of the driving receptive support roller and the driven receptive support roller arranged in parallel. Then, first, the engagement between the left and right driving receptive support rollers is released by the main clutch means, the left and right driving receptive rollers are connected through the clutch means to the respective motors, and the left and right rotation detecting rollers are connected through the left and right change-over clutch means to the inertial rotating means respectively, so that under this state the operational state of the ABS control can be evaluated by carrying out the same operation as above.

On the one hand, after the wheels of the vehicle are received and supported, the left and right driving receptive support rollers are disconnected by the action of the main clutch means, the left and right driving receptive support rollers are connected through the clutch means to the motors that can generate electricity and serve as loads, and the left and right rotation detecting rollers are disconnected from the respective inertial rotating means by the action of the change-over clutch means, so that under this state the operational state of the LSD control can be evaluated by carrying out the same operation as above.

On the other hand, the left and right driving receptive support rollers are connected by the main clutch means, the left and right driving receptive rollers are connected through the clutch means to the respective motors which can generate electricity and serve as loads, and the left and right rotation detecting rollers are disconnected from the respective inertial rotating means by the action of the change-over clutch means, so that under this state the operational state of the TRC control can be evaluated by carrying out the same operation as above.

Thus, according to the present invention, since a pair of receptive support rollers for receiving and supporting a wheel of a vehicle whose performance is to be inspected are provided and a rotation detecting roller that can be forcibly brought in contact with the received and supported wheel and can be rotatably driven and/or selectively inertially rotatably driven by said wheel is provided, the weight of the vehicle is only placed on said pair of the receptive support rollers and therefore the rotation detecting roller is not affected directly by the weight of the vehicle. Therefore, in the control of the ABS function, the LSD function, and the TRC function, suitable detected data on the operational state proper to the respective controls can be taken in precisely and as a result the performance of these functions can be evaluated accurately and easily.

DETAILED DESCRIPTION OF THE INVENTION

Embodiments of the vehicle performance inspection apparatus and the vehicle performance inspection method according to the present invention will now be described below in detail.

Shapes, sizes, materials, relative positions, etc. of the constitutional parts to be described in the embodiments are merely illustrations only unless otherwise stated and are not intended to limit the scope of the present invention.

In the description of the vehicle performance inspection apparatus according to the embodiments of the present invention, in order to avoid making the description of the apparatus and the description of the operation complicated unduly, for the sake of convenience, if the vehicle whose performance is to be inspected is of the 2WD (two wheel drive) type, only the part of the structural constitution related to the driving wheel side is described whereas if the vehicle whose performance is to be inspected is of the 4WD (four wheel drive) type, out of the parts of the structural constitution related to the driving wheel sides, only one part of them is described.

The constitution of the apparatus which is generally and commonly used is such that, for the case of a vehicle of the 2WD type, the parts of the structural constitution on the side of the driven wheels (front wheels for steering) are opposed to the parts of the structural constitution on the side of the driving wheels (rear wheels) and are arranged to correspond to the positions of the front and rear wheels, and for the case of a vehicle of the 4WD type, the parts of the structural constitution on the side of the driving wheels (front wheels and rear wheels) are opposed to each other and are arranged to correspond to the positions of the front wheels or the rear wheels, which will be described below collectively.

Figure 1:
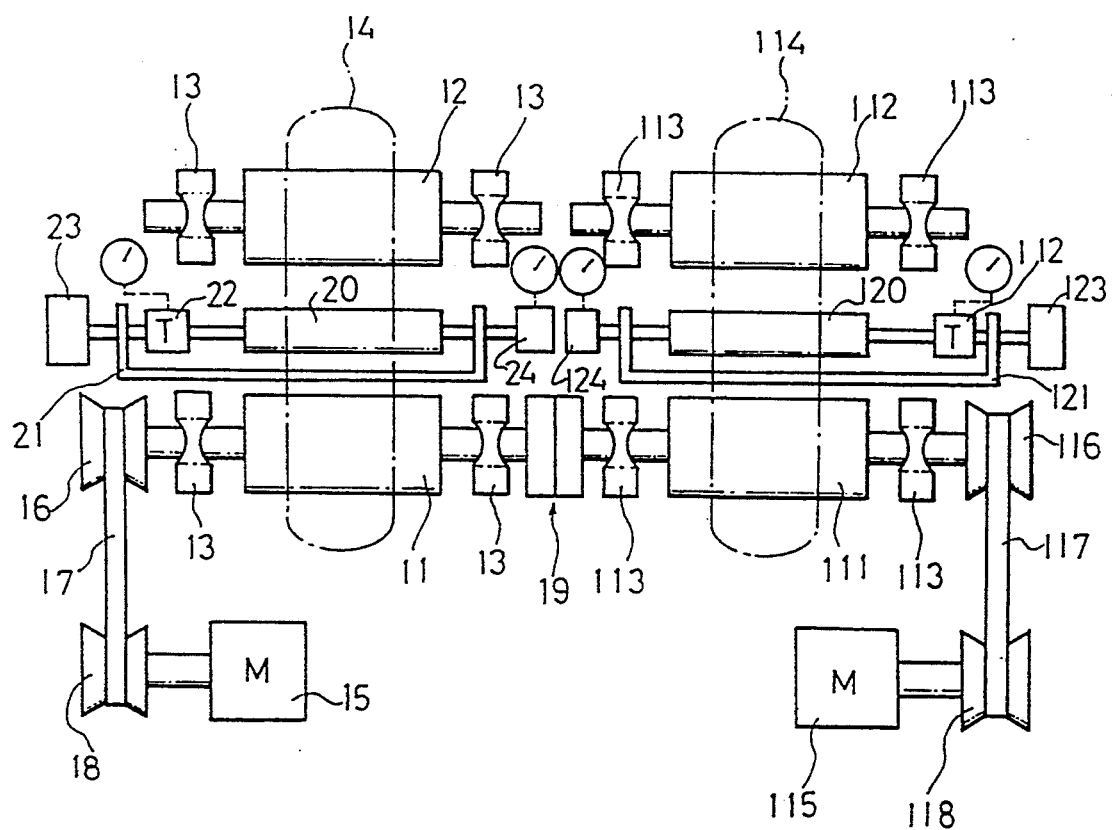
FIG. 1 a plan constitutional view showing schematically an outline of the major part of the performance inspection apparatus for the ABS function to which the first embodiment corresponding to the first invention of the present invention is applied.
Figure 2:
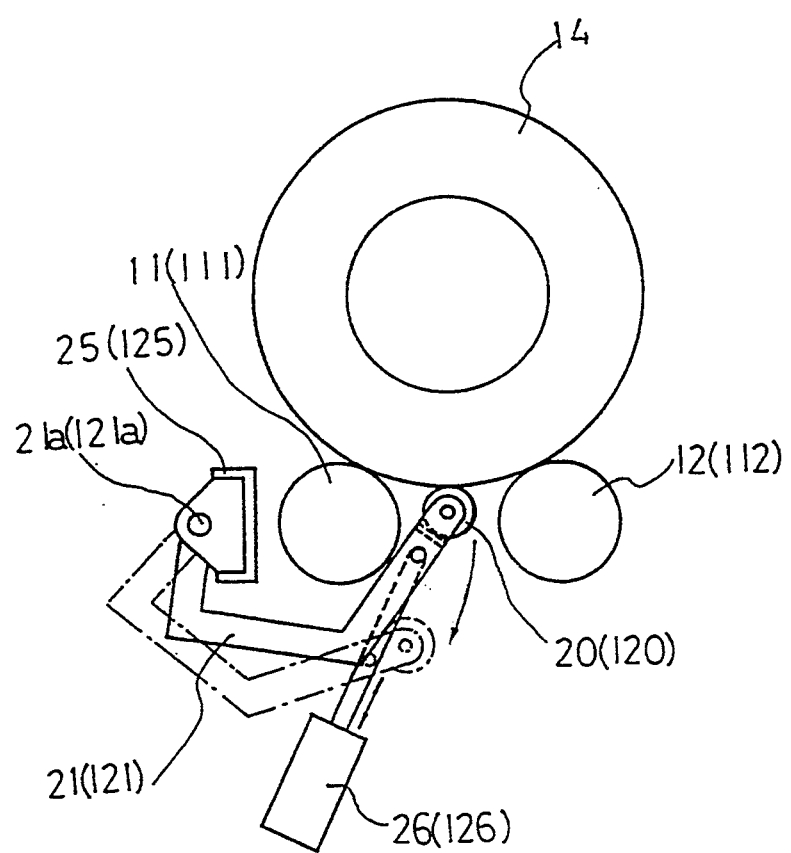
FIG. 2 is an end constitutional view showing schematically an outline of a swingable press engagement mechanism of a rotation detecting roller of the first embodiment.
Figure 3:
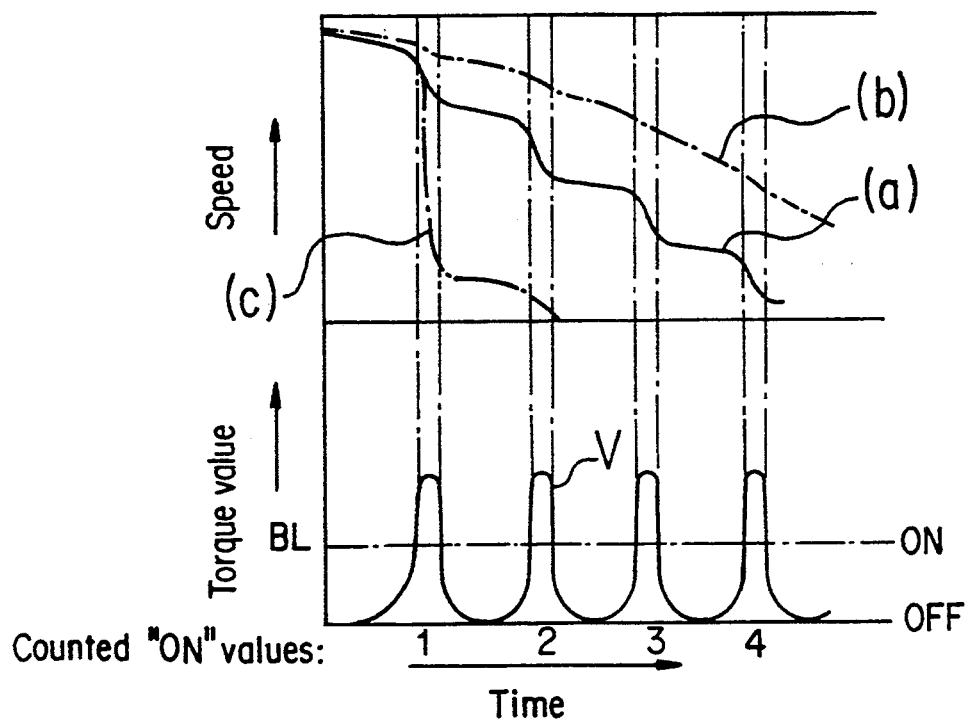
FIG. 3 is a graph showing the relationship in time sequence between the torque value and the wheel speed resulting from the action of the ABS function according to the first embodiment.
Figure 4:
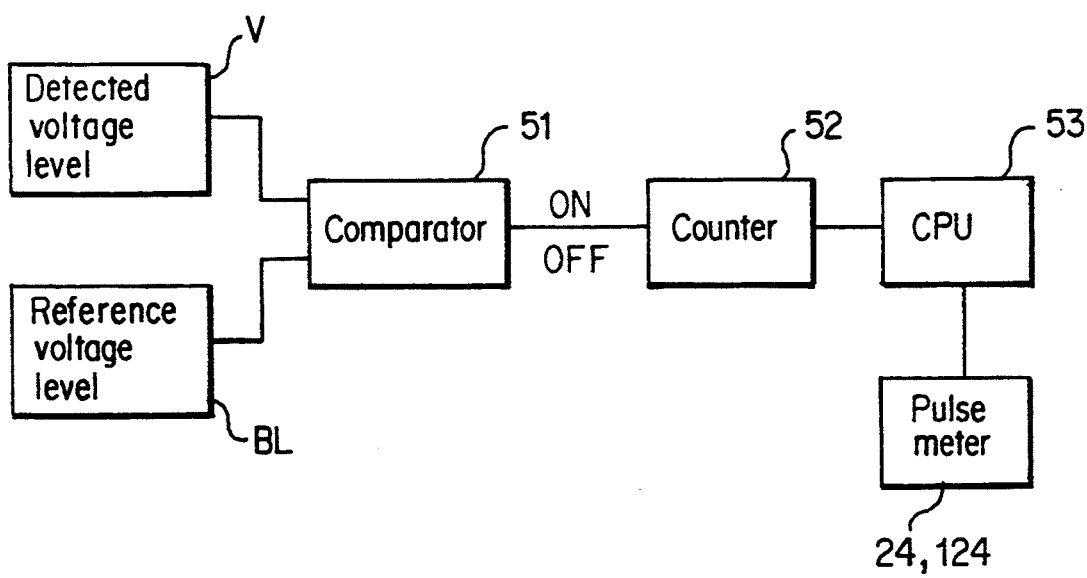
FIG. 4 is a block diagram showing the operating circuit of the performance inspection for the ABS function according to the first embodiment.

FIGS. 1 and 2 are a plan constitutional view showing schematically an outline of the major part of the apparatus for the inspection of the performance of the ABS function to which the first embodiment corresponding to the first invention of the present invention is applied and an end constitutional view showing schematically an outline of a swingable press engagement mechanism of a rotation detecting roller of the first embodiment, FIG. 3 is a graph showing the relationship in time sequence between the torque value and the wheel speed resulting from the action of the ABS function according to the first embodiment, and FIG. 4 is a block diagram showing the operating circuit of the performance inspection for the ABS function according to the first embodiment.

With respect to the constitution of the apparatus according to the first embodiment, although it is enough to describe the part of the constitution for the right wheel or the left wheel of front wheels or rear wheels, the parts of the constitution of the first embodiment which will be important with relation to the description of the second and third embodiments mentioned below are also described.

That is, the apparatus for the inspection of the performance of the ABS function according to the first embodiment shown in FIGS. 1 and 2 comprises left pairs of parallel receptive support rollers 11 and 12 and right pairs of parallel receptive support rollers 111 and 112 which are positioned to correspond to the positions of left and right wheels at the front wheel section and the rear wheel section of a vehicle and are rotatably arranged by bearings 13 and 113, and a left driving wheel 14 and a driving right wheel 114 of the vehicle whose performance is to be inspected can be orthogonally received and supported on the left and right receptive support rollers 11 and 12 and on the left and right receptive support rollers 111 and 112.

One end of one of the left paired receptive support rollers 11 and 12, for example, one end of the receptive support roller 11 is connected to a left motor 15, which acts as a rotational driving source, through a pulley 16, a belt 17, and a pulley 18, so that the receptive support roller 11 acts as a driving receptive support roller and the receptive support roller 12 acts as a driven receptive support roller.

One end of one of the right paired receptive support rollers 111 and 112 which is aligned with the left receptive support roller 11, that is, in this case, one end of the right receptive support roller 111 is similarly connected to a right motor, which acts as a rotational driving source, through a pulley 116, a belt 117, and a pulley 118, so that the receptive support roller 111 acts as a driving receptive support roller and the receptive support roller 112 acts as a driven receptive support roller. Between the left driving receptive support roller 11 and the right driving receptive support roller 111 that constitute a set, a main clutch means 19 for the control of engagement and disengagement, for example, an electromagnetic clutch is interposed to connect them.

Between the left paired parallel receptive support rollers 11 and 12 and between the right paired parallel receptive support rollers 111 and 112, rotation detecting rollers that can be controlled to be forcibly brought in contact with the left and right wheels 14 and 114 of the vehicle from below with a prescribed pressure that are received and supported on the left receptive support rollers 11 and 12 and the right receptive support rollers 111 and 112, preferably left and right rotation detecting rollers 20 and 120 having a diameter smaller than that of the left receptive support rollers 11 and 12 and the right receptive support rollers 111 and 112, are provided with them rotatably held by pivoting holders 21 and 121.

At one end of the shaft of the left rotation detecting roller 20 and the right rotation detecting roller 120, a left torque detecting means (for example, a torque meter) 22 and a right torque detecting means 122 and a left inertial rotating means 23 and a right inertial rotating means 123 such as a fly wheel for gaining inertial rotation are provided and the other end is provided with a left rotational frequency detecting means (for example, a pulse meter) 24 and a right rotational frequency detecting means 124.

The left and right pivoting holders 21 and 121 are supported by support brackets 25 and 125 swingably about base fulcrums 21a and 121a and are swung by extendable actuators, for example, a left oil pressure actuator 26 and a right oil pressure actuator 126 so that they can be forcibly brought in contact with the received and supported left wheel 14 and right wheel 114 from below.

In another way, said left and right rotational frequency detecting means 24 and 124 may be provided on the shafts of the driving receptive support rollers 11 and 111.

Now, the operation of the apparatus for the inspection of the performance of the ABS function according to the first embodiment having the above constitution will be described.

For the purpose of simplifying the explanation, only the operation on the side of the left receptive support rollers 11 and 12 is described and since the operation on the side of the right receptive support rollers 111 and 112 is similar to the former, the description thereof is omitted.

Concerning the apparatus for the inspection of the performance of the ABS function according to the first embodiment, first the left wheel 14 of the vehicle whose performance is to be inspected is allowed to be received and supported on the pair of the parallel receptive support rollers 11 and 12 orthogonally with the main clutch means 19 kept inactive, and then the left rotation detecting roller 20 is forcibly brought in contact with the left wheel 14 by the left oil pressure actuator 26.

Then, the driving receptive support roller 11 is rotatably driven so that the received and supported left wheel 14 may be rotated at the rotational frequency corresponding to the vehicle speed at the time of usual driving, for example, a vehicle speed of about 30 to 60 km/h and at the same time the left rotation detecting roller 20 is allowed to follow the rotation of the left wheel 14 so that rotational energy may be stored in the left inertial rotating means 23.

These rotations are carried out under the control of a computer on the basis of the rotational frequency signals outputted from the left rotational frequency detecting means 24.

After the rotational speed of each of the left wheel 14 and the left rotation detecting roller 20 is brought to a steady state, a braking action is started from inside the vehicle upon the left wheel 14 with the rotational driving of the driving receptive support roller 11 and the left rotation detecting roller 20 including the left inertial rotating means 23 being kept.

With the start of this braking action, the rotational torque or the load change produced between the left rotation detecting roller 20 and the left driving wheel 14 are detected by the left torque detecting means 22, then after changes in the torque are measured in time sequence as shown in FIG. 3(a), the detected voltage level V corresponding to the change of the torque is compared with the reference voltage level or base level BL indicative of braking threshold torque values by a comparator 51 and when the detected voltage level V reaches or exceeds the reference voltage level BL as shown graphically in FIG. 3, the ON signals outputted from the comparator 51 are counted by counter 52, and on the basis of the counted value and the rotational frequency signals from the left rotational frequency detecting means 24, it is evaluated by a computer 53 whether the ABS is working normally or not by comparing the counted torque value peaks and the wheel rotational speed values as shown graphically by curves (a), (b) and (c) in FIG. 3. Curve (a) represents proper step-by-step braking action of the ABS; curve (b) represents a too gradual decrease in wheel speed indicative of inadequate braking action due to improper ABS operation, and curve (c) represents an excessive drop in wheel speed indicative of inadequate ABS operation and a danger of wheel locking.

In this case, since the detected value by the left torque detecting means 22 is in agreement with the load resistance between the wheel and the running surface, the inspection of the desired ABS control for a vehicle, whose performance is to be inspected, by simulation becomes possible, and particularly, in the case of this first embodiment, since the measurement is possible with the rotational driving of the left rotation detecting roller 20 being kept by adding the stored energy of the left inertial rotating means 23, in other words, with the subject vehicle experiencing at all times a load resistance from the left receptive support rollers 11 and 12 corresponding to the running road surface similarly to the actual driving, the evaluation of the braking performance approximately equivalent to the mode of the actual road surface is possible.

In more detail, in the case of this first embodiment, a different point from the above conventional case is that the detection of the braked state is effected by the left rotation detecting roller 20 in association with the left inertial rotating means 23 in order to eliminate the effect associated with the change in the weight of the vehicle. That is, when braking action is effected from inside the vehicle upon the left wheel 14, the rotational speed of the left rotation detecting roller 20 is decreased accordingly, but since the left inertial rotating means 23 will continue the rotation at the prescribed rotational frequency owing to the inertia force thereof, torque is generated at the shaft part connecting them, the value of the torque at that time corresponding to the load change, and by taking said value of the torque and the speed of the rotation of the left wheel 14 through the left rotation detecting roller 20 into account, the operational state of the ABS function can be tested precisely by correlating torque peaks due to braking with wheel rotational speed values which indicate proper or inadequate braking or wheel locking as shown graphically in FIG. 3.

Figure 5:
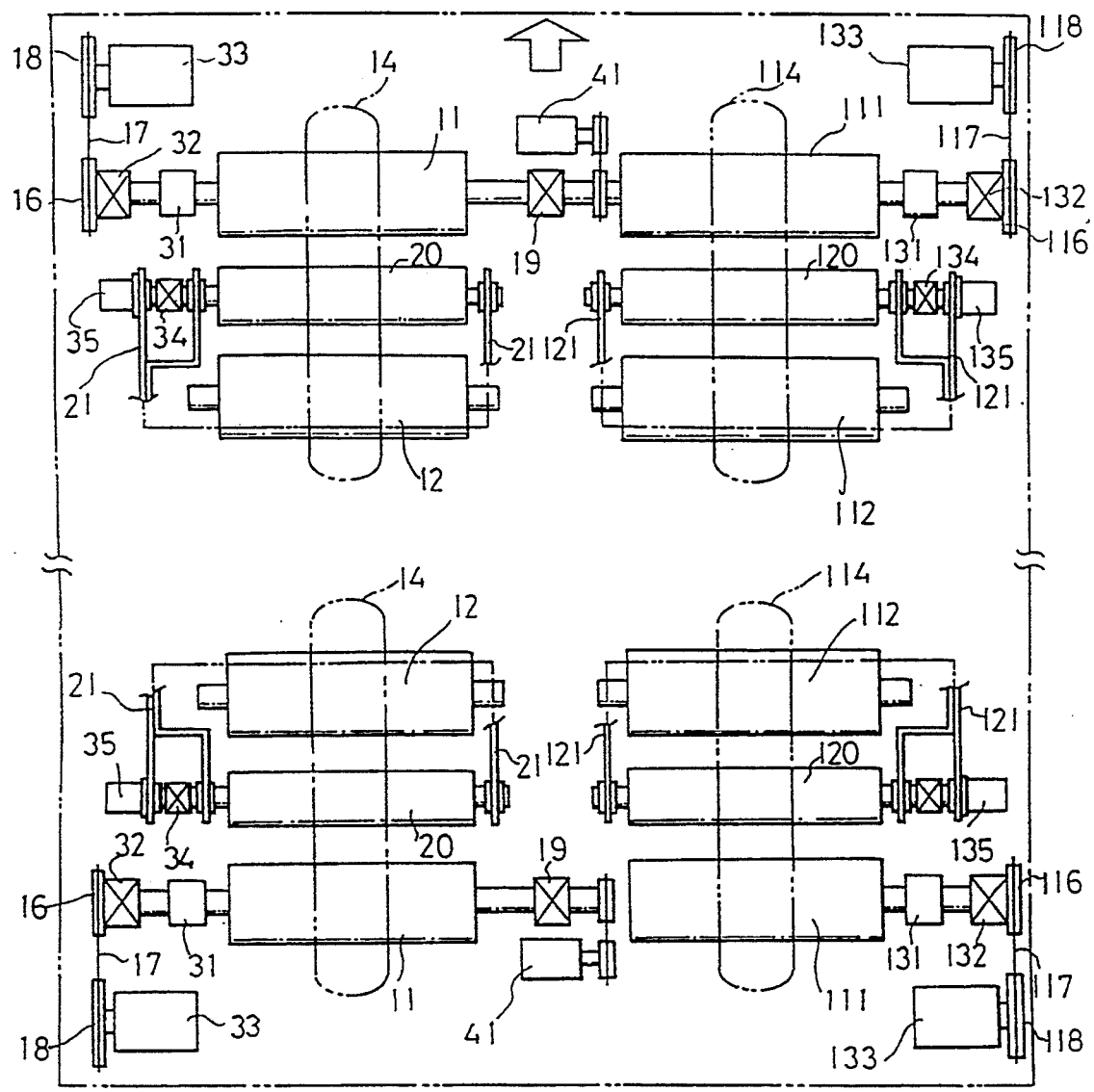
FIG. 5 is a plan constitutional view showing schematically a general outline of the apparatus for the inspection of the performance of the LSD function and the TRC function to which the second embodiment corresponding to the second invention of the present invention is applied.
Figure 6:
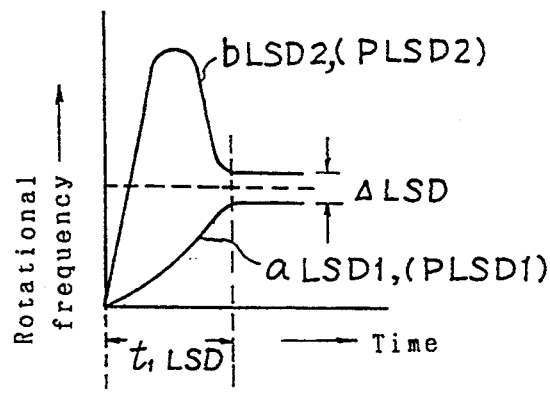
FIG. 6 is a graph showing the relationship between the time and the wheel speed in the LSD function of the second embodiment.
Figure 7:
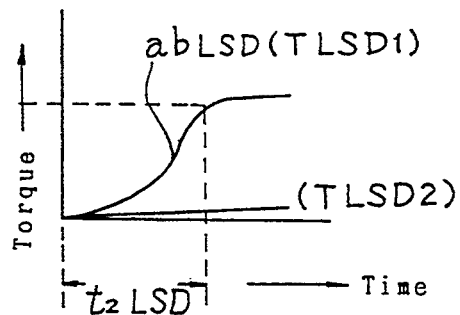
FIG. 7 is a graph showing the relationship between the time and the torque value in the LSD function in the second embodiment.
Figure 8:
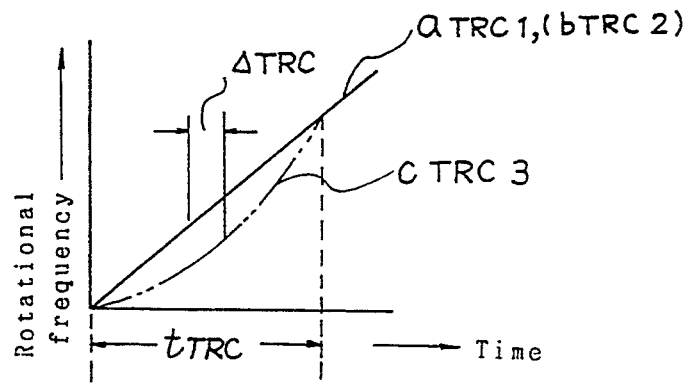
FIG. 8 is a graph showing the relationship between the time and the rotational frequency in the TRC function of the second embodiment.

FIG. 5 is a plan constitutional view showing schematically the whole of an outline of the apparatus for the inspection of the performance of the LSD function and the TRC function to which the second embodiment corresponding to the second invention of the present invention is applied, FIG. 6 is a graph showing the relationship between the time and the wheel speed in the LSD function of the second embodiment, FIG. 7 is a graph showing the relationship between the time and the torque value in the LSD function in the second embodiment, and FIG. 8 is a graph showing the relationship between the time and the rotational frequency in the TRC function of the second embodiment.

That is, similarly to the case of the apparatus of the first embodiment, the apparatus for the inspection of the performance of the LSD function and the TRC function according to the second embodiment shown in FIG. 5 has a set of pairs of parallel left receptive support rollers 11 and 12 and pairs of parallel right receptive support rollers 111 and 112 that are positioned to correspond to the positions of the left and right wheels of the front wheel section and the rear wheel section of a vehicle and are arranged rotatably and the left and right driving wheels 14 and 114 of a vehicle whose performance is to be inspected can be received and supported orthogonally on the left and right receptive support rollers 11 and 12 and 111 and 112.

One end of one of the paired parallel left receptive support rollers 11 and 12, for example, one end of the left receptive support roller 11 is provided with a left torque detecting means (for example, a torque meter) 31, and is connected though a left clutch means 32, a pulley 16, a belt 17, and a pulley 18 to a left motor 33 that acts as a rotation driving means and also as a voltage generating means as a load so that the left receptive support roller 11 may act as a driving receptive support roller and the other receptive support roller acts as a driven receptive support roller.

One end of the right receptive support roller 111 that is in alignment with the left driving receptive support roller 11 is provided with a right torque detecting means (for example, a torque meter) 131, and is connected though a right clutch means 132, a pulley 116, a belt 117, and a pulley 118 to a right motor 133 that acts as a rotation driving means and also as a voltage generating means as a load so that the right receptive support roller 111 may act as a driving receptive support roller and the other receptive support roller 112 acts as a driven receptive support roller.

The left and right driving receptive support rollers 11 and 111 are connected through a main clutch means 19 and a main rotation frequency detecting means (for example, a pulse meter) 41 is rotatably connected to the shaft of one of the left and right driving receptive support rollers 11 and 111, for example, the right driving receptive support roller through a pulley, a belt, and a pulley.

Between the paired parallel left receptive support rollers 11 and 12 and between the paired parallel right receptive support rollers 111 and 112, rotation detecting rollers that can be controlled to be forcibly brought in contact with the left and right driving wheels 14 and 114 of the vehicle from below with a prescribed pressure that are received and supported on the left receptive support rollers 11 and 12 and the right receptive support rollers 111 and 112, preferably left and right rotation detecting rollers 20 and 120 having a diameter smaller than that of the receptive support rollers 11, 12 and 111 and 112 are provided with them rotatably held by pivoting holders 21 and 121, which are constructed in the same way as those of the first embodiment.

One end of the left and right rotation detecting rollers 20 and 120 is provided with left and right rotational frequency detecting means (for example, pulse meters) 35 and 135 through couplings 34 and 134.

The operation of the apparatus for the inspection of the performance of the LSD and TRC functions according to the second embodiment having the above constitution will now be described.

First, the inspection of the performance of the LSD function will be described. As is well known, the LSD function is a differential mechanism for absorbing the difference between rotations of the left and right wheels at the time of deviation which has a so-called viscous coupling mechanism built therein between the driving shafts for transmitting rotation to the left and right wheels so as to distribute optimally the rotational driving torque to the left and right wheels in proportion to the difference of the rotations.

For the inspection of the performance of this LSD function, left and right driving wheels of a vehicle whose performance is to be inspected are received and supported on the paired left receptive support rollers 11 and 12 and the paired right receptive support rollers 111 and 112. Then, the engine of the vehicle is started with the left and right rotation detecting rollers 20 and 120 forcibly brought in contact with the left and right wheels 14 and 114. Next, the left and right receptive support rollers 11 and 111 are disconnected by the disengagement action of the main clutch means 19, and one of the left and right receptive support rollers is disconnected from the motor 13 or 133, for example, the right receptive support roller 111 is disconnected from the motor 133 by the disengagement action of the clutch means 132 while the connection of the left receptive support roller 11 to the motor 33 are kept by the clutch means 32. In other words, the left motor 33 is used as a voltage generating means as a load for the inspection for the left receptive support rollers 11 and 12 and the right motor 133 is disconnected from the right receptive support rollers 111 and 112, so that they become free. Under this state, the vehicle is started.

Thus, by giving these conditions to the pairs of the left and right receptive support rollers 11, 12, 111, and 112, the situation of the road surface at the time of start similar to the deviation of the vehicle at the time of start can be set, i.e., the situation of the road surface at the time of start wherein a desired LSD function is required to be effected can be set by differentiating the rotations of the left and right wheels 14 and 114.

In the above state for the inspection of the performance of the LSD function, since the left and right receptive support rollers 11 and 111 are disconnected by the disengagement action of the main clutch means 19, on the side of the left receptive support rollers 11 and 12 the left motor 33 connected with the left clutch means 32 acts as a load as a voltage generating means wherein a voltage corresponding to the rotational driving force due to the self-running vehicle is generated while by the left torque detecting means 31 a torque T LSD1 corresponding to the rotational driving force with the load being applied is detected and outputted, and at the same time by the rotational frequency detecting means 35 of the left rotation detecting roller 20 a rotational frequency P LSD1 at the rotatably driving force with the load being applied is detected and outputted, and further since, on the side of the right receptive support rollers 111 and 112, the right motor 133 not connected through the clutch means 132 is in the free state thereby it does not act as a load, a torque T LSD2 corresponding only to the rotatably driving force without a load is detected and outputted by the right first torque detecting means 131, and at the same time by the rotational frequency detecting means 135 of the right rotation detecting roller 120 a rotational frequency P LSD2 at the rotatably driving force without a load is detected and outputted.

In this case, the rotational frequency P LSD1 of the left wheel 14 outputted at the left rotational frequency detecting means 35 and the rotational frequency P LSD2 of the right wheel 114 detected at the right rotational frequency detecting means 135 have a relation of P LSD1=P LSD2 or P LSD1≅P LSD2 before deviated operation, but at the time when the above conditions are set, i.e., at the time of start of a deviated operation, the rotational frequencies on the left and right sides, in other words, the rotational frequency P LSD1 of the left wheel 14 on the loaded side (corresponding to the inside wheel substantially at the time of deviation in the case of the above set conditions) and the rotational frequency P LSD2 of the right wheel on the free side (corresponding similarly to the outside wheel substantially at the time of deviation in the case of the above set conditions) are placed approximately under the relationship of P LSD1<P LSD2 where there is substantially a difference between the rotations of the left wheel 14 and the right wheel 114.

With the lapse of time of the deviated operation, by making the LSD control in conformity with the lapse of the time, i.e., the difference between the rotations, rotational driving torques are applied to the left and right wheels 14 and 114 at the optimum proportion and as a result the difference between the rotations (P LSD1<P LSD2) is gradually absorbed, then at the end of the deviated operation, it approaches the initial relationship of P LSD1=P LSD2 or P LSD1≅P LSD2, and the rotational torque on the loaded side from the start of the deviated operation to the end thereof and the absorption torque on the loaded side against the free side is measured by the left torque detecting means 31.

Therefore, herein, by a computer not shown, the rotational frequency P LSD1 of the left wheel 14 detected by the left rotational frequency detecting means 35 is continuously compared with the rotational frequency P LSD2 of the right wheel 114 detected by the right rotational frequency detecting means 13, thereby evaluating the time until the rotational difference P LSD2<P LSD2 approaches to P LSD1=P LSD2 or P LSD1≅P LSD2 within the allowable prescribed difference range and the time until the torque value detected by the left torque detecting means 31 reaches the allowable value, so that the inspection of the performance of the LSD function can be effected desirably.

That is, more specifically, with respect to the difference between the rotational frequencies, at the time of the start of the deviated operation, as is shown in FIG. 6, the rotational frequency P LSD1 of the left wheel on the loaded side rises gradually due to the action of the LSD function toward the rotational frequency of a predetermined specific allowable value like the operation curve aLSD1, and, on the other hand since there is no load element, the rotational frequency P LSD2 of the right wheel 114 on the free side rises once sharply over the rotational frequency of the above allowable value like the operation curve bLSD2 and then drops gradually gradually due to the action of the LSD function toward the allowable value. After the lapse of the operating time t 1LSD, they reach within a prescribed difference width ΔLSD of the rotational frequency of the allowable value and, with respect to the absorption torque value, as is shown in FIG. 7, the absorption curve abLSD follows approximately the same course as the operation curve aLSD1 and reaches the allowable value after the absorption time t 2LSD and from the operation time t 1LSD and the absorption time t 2LSD the performance of the LSD function can be evaluated. If loads connected through the clutch means to the left and right driving receptive support rollers are changed from each other, the test of the LSD function at the time when one of the wheels of the vehicle passes through a place whose friction coefficient is different from that of the places where other wheels pass becomes possible.

Now, the inspection of the performance of the TRC function is described. The TRC function is well known as a function for increasing the running stability and securing favorably and effectively the runnability at the time of starting operation, abrupt starting operation, and quick acceleration operation by controlling the driving output of the mounted engine appropriately to the situation of the running surface and by distributing optimally the rotational driving force to be transmitted to the left and right driving wheels to restrain the spinning of the left and right driving wheels which is liable to occur at the time of the starting operation, abrupt starting operation, or quick acceleration operation.

Herein, in carrying out the inspection of the performance of the TRC function, similarly to the case of the above LSD function, first the left and right driving wheels 14 and 114 of a vehicle are received and supported on the left and right receptive support rollers 11, 12,111, and 112 and the left and right rotation detecting rollers 20 and 120 are forcibly brought into contact with the left and right wheels 14 and 114.

The connection between the left and right receptive support rollers 11 and 111 is kept by the action of the main clutch means 19, also the connection between the left and right receptive support rollers 11 and 111 and the motors 33 and 133 is kept by the action of the clutch means 32 and 132 and the motors 33 and 133 are used as voltage generating means as loads for the inspection.

Then, with this state, for example, the engine of the vehicle is started to bring it to an abruptly started state so that the left and right wheels 14 and 114 and the left and right receptive support rollers 11, 12, 111, and 112 may be rotated at a high speed and the vehicle is kept substantially and approximately at a state wherein the vehicle is started abruptly or accelerated abruptly.

Then in the state for the inspection of the performance of the TRC function, the rotational speed P TRC3 common to the left and right receptive support rollers 11 and 111 connected through the main clutch means 19 is detected and outputted by the main rotating frequency detecting means 41, the rotational speed P TRC1 of the left rotating wheel 14 received and supported on the left receptive support rollers 11 and 12 is detected and outputted by the left rotational frequency detecting means 35 through the left rotation detecting roller 20, and the rotational speed P TRC2 of the right rotating wheel 114 received and supported on the right receptive support rollers 111 and 112 is detected and outputted by the right rotational frequency detecting means 135 through the right rotation detecting roller 120.

As is shown in FIG. 8, with respect to the rotational speed P TRC3 out of the thus detected rotational speeds P TRC3, P TRC 1, and P TRC2, due to the load elements of the motors 33 and 133 applied to the left and right receptive support rollers 11 and 111, its speed curve cTRC3 indicates values having a prescribed slip difference ΔTRC, and with respect to the rotational speeds P TRC1 and P TRC2, since the load elements by the motors 33 and 133 are not applied, the speed curves aTRC1 and bTRC2 indicate linear values, and the relationship between the rotational speeds is placed approximately under the relationship of P TRC3≦P TRC1, P TRC2.

The action of the TRC control, i.e., the output control of the engine brings the slip difference ΔTRC to nil, processing by a computer not shown is carried out, and as a result the operation time t TRC from the abrupt start or abrupt acceleration to the end thereof is evaluated, so that the inspection of the performance of the TRC function can be carried out desirably. In the case of a 4WD type, if the value of the load on the front wheel side and the value of the load on the rear wheel side are differentiated, the LSD test between the front and rear wheels can be carried out.

Figure 9:
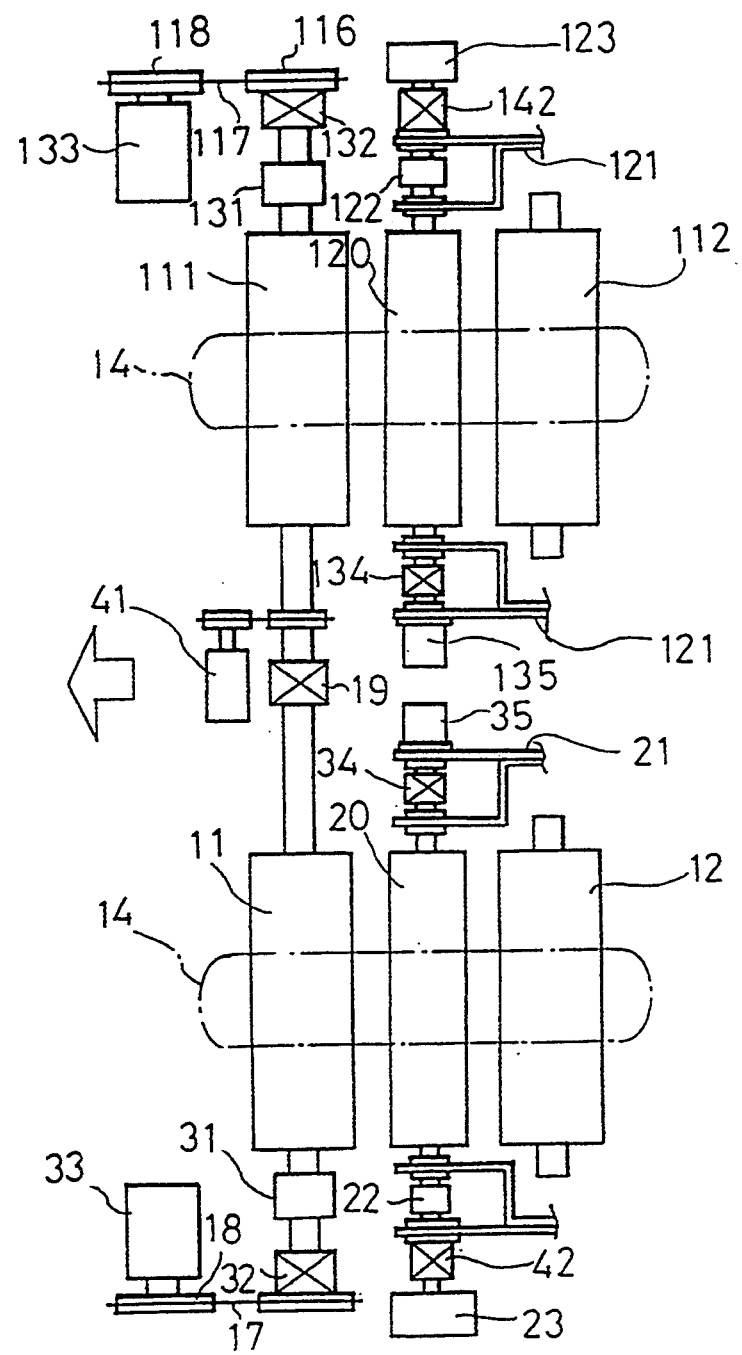
FIG. 9 is a plan constitutional view showing schematically an outline of the major part of the apparatus for the inspection of the performance of the ABS function, the LSD function, and the TRC function to which the third embodiment corresponding to the third invention of the present invention is applied.
Figure 10:
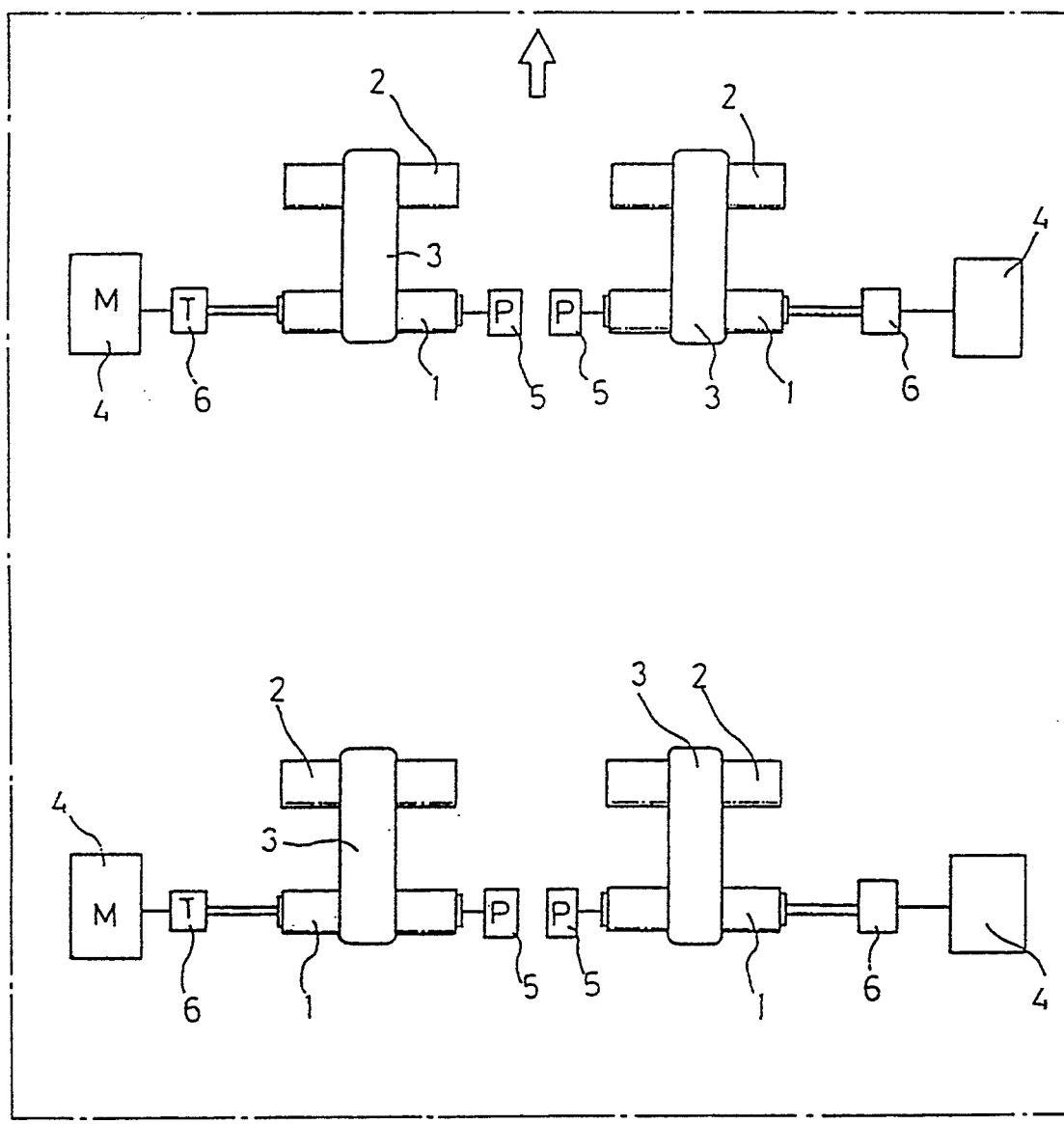
FIG. 10 is a plan constitutional view showing schematically a general outline of the apparatus for the inspection of the performance of the ABS function according to a prior art embodiment.

FIG. 9 is a plan constitutional view showing schematically an outline of the major part of the apparatus for the inspection of the performance of the ABS function, the LSD function, and the TRC function to which the third embodiment corresponding to the third invention of the present invention is applied.

In the case of the constitution of the apparatus according to the third embodiment, similarly to the constitution of the apparatus according to the second embodiment for carrying out the inspection of the performance of the LSD function and the TRC function, one end of left and right rotation detecting rollers 20 and 120 is provided with left and right rotational frequency detecting means 35 and 135 through couplings 34 and 134, also similarly to the constitution of the apparatus according to the first embodiment for carrying out the inspection of the performance of the ABS function, the other end thereof is provided with left and right torque detecting means 22 and 122, and further left and right inertial rotating means 23 and 123 such as fly wheels for gaining inertial rotation through left and right change-over clutch means 42 and 142 are provided.

Accordingly, in this apparatus of the third embodiment, by bringing the left and right change-over clutch means 42 and 142 to the state of the engagement action, the inspection of the performance of the ABS function becomes possible in the same manner as in the case of the apparatus of the first embodiment described above in detail, while by bringing the change-over clutch means 42 and 142 to the state of the disengagement action, the inspection of the performance of the LSD function and the TRC function becomes possible in the same manner as in the case of the apparatus of the second embodiment described above in detail, and the inspection of the performance of these functions can be effected easily only by the apparatus of the third embodiment by the change-over operation of the change-over clutch means 42 and 142 to obtain the same action and effect as those of the first and second embodiments.

What is claimed is:

1. A vehicle performance inspection apparatus for evaluating the operational state of an ABS control, said apparatus comprising:

front and rear, left and right pairs of parallel receptive support rollers, one of the receptive support rollers of each pair being a driving receptive support roller and the other being a driven receptive support roller, for receiving and supporting the left and right wheels of the front wheel section and the left and right wheels of the rear wheel section of a vehicle, respectively, left and right motors for rotatably driving the left and right driving receptive support rollers, left and right rotation detecting rollers that can be forcibly brought in contact with the left and right vehicle wheels received and supported on said left and right driving receptive support rollers and said left and right driven receptive support rollers, said rotation detecting rollers being rotated in response to rotation of the vehicle wheels, left and right rotation frequency detecting means for detecting the rotational frequencies of said left and right wheels through said left and right rotation detecting rollers, left and right inertial rotating means that are inertially rotated by the rotation of said left and right rotation detecting rollers, and torque detecting means for detecting driving torques respectively between said rotation detecting rollers for the respective left and right wheels and said inertial rotating means for the respective rotation detecting rollers.

2. A vehicle performance inspection apparatus for individually evaluating the operational states of an LSD control and a TRC control, said apparatus comprising:

left and right pairs of parallel receptive support rollers, one of the receptive support rollers of each pair being a driving receptive support roller and the other being a driven receptive support roller, for receiving and supporting the left and right wheels of the driving section of a vehicle, main clutch means for connecting or disconnecting the left and right driving receptive support rollers, main rotational frequency detecting means for detecting the rotational frequencies of the driving receptive support rollers, left and right motors that can be connected to or disconnected from the left and right driving receptive support rollers through left and right clutch means and can also act as voltage generating means as loads, left and right torque detecting means for detecting the driving torques between the left and right voltage generating means as loads and the driving receptive support rollers associated therewith, left and right rotation detecting rollers that can subordinatively be rotated by causing them to be forcibly brought into contact with the left and right wheels received and supported on the left and right driving receptive support rollers and driven receptive support rollers, and left and right rotational frequency detecting means for detecting the rotational frequencies of the wheels through said rotation detecting rollers.

3. A vehicle performance inspection apparatus for individually evaluating the operational states and performance of an ABS control, an LSD Control and a TRC control, said apparatus comprising:

left and right pairs of parallel receptive support rollers, one of the receptive support rollers of each pair being a driving receptive support roller and the other being a driven receptive support roller, for receiving and supporting the left and right wheels of the driving section of a vehicle, main clutch means for connecting or disconnecting the left and right driving receptive support rollers, main rotational frequency detecting means for detecting the rotational frequencies of the driving receptive support rollers, left and right motors that can be connected to or disconnected from the left and right driving receptive support rollers through clutch means and can also act as voltage generating means as loads, left and right first torque detecting means for detecting the driving torques between the left and right voltage generating means as loads and the driving receptive support rollers associated therewith, left and right rotation detecting rollers that can subordinatively be rotated by causing them to be forcibly brought into contact with the left and right wheels received and supported on the left and right driving receptive support rollers and driven receptive support rollers, left and right rotational frequency detecting means for detecting the rotational frequencies of the left and right wheels through said left and right rotation detecting rollers, left and right inertial rotating means that can be connected to or disconnected from said left and right rotation detecting rollers through left and right change-over clutch means and can be rotated inertially by the above subordinative rotation, and left and right second torque detecting means for detecting the driving torques between the rotation detecting rollers for said left and right wheels and the inertial rotating means associated with said rotation detecting rollers.

* * * * *